Patented Dec. 3, 1935

2,022,707

UNITED STATES PATENT OFFICE 2,022,707

COMPOSITION TILE

Edmund Claxton and Martin K. Bare, Lancaster, Pa., assignors to Armstrong Cork Company, Lancaster, Pa., a corporation of Pennsylvania No Drawing. Application June 20, 1932, Serial No. 618,300. Renewed February 7, 1935

10 Claims. (Cl. 106—22)

This invention relates to composition tiles and more particularly to a composition tile for use as a wall, floor or roof covering having a suitably flexibilized and toughened resinous binder.

Composition tiles of the so-called asphalt or mastic type consist of a suitable filler or fillers held together by a binder or cement. The usual fillers are asbestos, color pigments and various mineral fillers. The most commonly used binder consists of pitch, gilsonite and resin.

The asphalt or mastic tiles now on the market have not proved to be entirely satisfactory. The binders which have heretofore been used produce a hard but brittle tile and there is considerable breakage in handling and shipping. It is not unusual for a manufacturer to have a 20% loss in shipment due to cracked and broken tiles. These commonly used binders are of a dark color and the production of light colored tiles therefrom is commercially impracticable. In order to produce bright or brilliant colors, large amounts of expensive pigments are required to cover an asphaltic binder. This increases the cost and produces an inferior product because of the high ratio of pigment to strengthening fiber such as asbestos. The mastic tile manufacturers have, as a consequence, limited their production to the darker colored compositions.

The present trend in the wall and floor covering industry is toward marbleized or striated effects. These necessitate the production of relatively light colored compositions, which, when intermixed, provide striking variegated effects. There is also a large demand for light colored tiles and for brilliant colorings.

According to our invention, a light colored binder is provided for use with suitable coloring pigments and fillers to produce light or dark colored compositions which are hard, tough, alkali resistant and stable.

The binder is formed of a light colored resin which is suitably toughened and flexibilized. Cumar, which is a polymerization product of coumarone and indene, having a melting point between 100 and 140° C. forms a highly desirable resin base for the binder. It is pale yellow in color, cheap and readily available and is highly resistant to attack by alkalies. It is hard and friable, however, and must be modified to make it tough and flexible.

We have found that a siccative oil gel produces a satisfactory toughening and flexibilizing agent. A gel produced by oxidation is particularly suited for our use. The oil is preferably thoroughly preoxidized in the presence of an anti-coagulant in order to produce a stable gel.

In order that our invention may be more readily understood we will describe a specific embodiment thereof as applied to the production of a thoroughly preoxidized menhaden-linseed oil flexibilizing and toughening agent. It will be understood, however, that other types of drying or semi-drying oils or mixtures thereof may be substituted for the oil herein recited; it being our intention to recite a specific example of a composition which will give the desired results as a matter of illustration and not of limitation.

A thoroughly preoxidized oil gel may be readily produced in the usual mechanical oxidizers. An oxidizer of the Bedford type which comprises a heated vessel provided with a stirring means and an inlet for admitting air to the material in the vessel is satisfactory for this purpose.

We prefer to use rosin as the anticoagulant because of its cheapness and also because of the desirable characteristics which it imparts to the final binder. It is thermoplastic and is readily workable at milling and calendering temperatures. It serves to some extent to toughen the final product. Rosin is an effective anticoagulant or peptizer and permits the production of a thoroughly oxidized oil gel in a few hours at relatively low temperatures. An effective amount of suitable driers are added to the oil-rosin mixture prior to oxidation.

A tough, flexible oil gel of low pigmenting value may be produced by mechanically oxidizing the following mixture:

| | Parts by weight |
|---|---|
| Menhaden oil | 27 |
| Linseed oil | 3 |
| Rosin | 10 |
| Driers, such as litharge or manganese resinate, up to a metallic content of about 2% of the weight of the oil. | |

The mixture is placed in the Bedford oxidizer and the temperature raised to about 230° F. Air is forced into the oil mixture and agitation is carried on. A stiff, tough gel is produced after about 22 hours of oxidizing.

The menhaden-linseed oil mixture produces a so-called hard oil gel. A somewhat softer gel may be produced by using all linseed oil in place of the menhaden-linseed oil mixture. Menhaden oil, however, is somewhat less expensive than linseed oil and even without admixture of other oils produces a satisfactory material for our purpose.

A somewhat cheaper but nevertheless satisfactory oil gel may be produced by thoroughly oxidizing a mixture of 60 parts by weight of soya bean oil and 40 parts by weight of rosin together with suitable driers. This produces a tough, flexible oil gel which is of low pigmenting value, thermoplastic and readily workable. We prefer to use a thoroughly preoxidized siccative oil gel because of its stability, i. e., its physical characteristics do not change upon aging.

In placing of a thoroughly oxidized oil gel, a suitable toughening and flexibilizing gel may be produced by the well-known "shed oil" process wherein the oil is given an oxidizing treatment by periodically running the oil over long hanging strips of fabric, such as scrim, upon which a film of the oil is formed and oxidized by exposure to the air in moderately heated sheds. This produces a "dry gel" which possesses little binding value. The gel is comminuted and heated with rosin. A mixture of 75 parts by weight of shed oil and 25 parts by weight of rosin will, when heated to about 270° F. in an open type kettle, produce a satisfactory toughening agent.

The gel may be produced by mechanically oxidizing the oil in the Bedford oxidizer without the addition of rosin. This produces a gel in which a relatively large portion of the oil is unoxidized and as a result the gel is not as stable as an oil gel produced with the aid of an anticoagulant. This type of oil gel is known as "mechanical oil". We have successfully used this type of oil gel as a toughening agent. A somewhat softer final product is obtained when this material is used.

The resin is preferably the major constituent of the binder although we have successfully incorporated up to 50% of flexibilizing and toughening material. As an example, we have produced a bright red tile composition using Cumar as the base of the binder and a thoroughly preoxidized menhaden-linseed oil gel as the flexibleizing and toughening material, the various ingredients being incorporated in the following proportions, all parts being given by weight:

|  | Parts |
|---|---|
| Cumar | 80 |
| Oil gel | 40 |
| Color pigments | 7.15 |
| Whiting | 70 |
| Long fiber asbestos | 40 |
| Short fiber asbestos | 160 |

The Cumar is placed with the oil gel into an open type mixer. We prefer to use a mixer of the well-known Werner-Pfleiderer type. This mixer is provided with a shell type kettle which is heated by the use of steam and with two mixing blades which revolve in opposite directions. One blade travels slightly faster than the other in order to aid in thorough mixing. The blades are cored out and are provided with steam connections.

The pigments and filler are added preferably after the resin and gel have been intermixed although all the constituents may be placed in the mixer at the same time. The heat is raised and a temperature somewhere between 250 and 300° F. is obtained. This heat is maintained and mixing continued until a homogeneous, tough, dough-like mass is obtained. This usually requires 15 to 20 minutes for a batch weighing about 400 pounds. The heat melts down the thermoplastic binder which thoroughly coats the pigment and filler particles and unites the mass. The mass is then fed to suitable forming machines. In the manufacture of flat tiles, the hot plastic composition is fed from the mixing machine to a pair of milling rolls. The facing roll is heated to about 200° F. and the backing roll is maintained at about 290° F. The facing roll usually travels at somewhat greater speed than the backing roll. The composition is milled or frictioned from 15 seconds to 1 minute. This removes all of the blisters from the sheet and produces a uniform layer of composition around the face roll. This sheet is then stripped from the roll. If a high gloss face is desired, the milled sheet is usually made slightly thicker than that desired in the final product. The sheet is then passed through a facing calender which reduces the sheet to the final thickness and produces a high gloss face. The temperature of the face roll on the finishing calender may be maintained at about 120° F. and the backing roll at about 70° F. The sheets are permitted to cool to about 140° F. before dieing to proper size. Other shapes may be made as is well known in this art.

The tiles thus produced are hard but are capable of withstanding rough handling and shipment without cracking or breaking. As a comparison with linoleum tile, our composition tile, when tested on a machine in which a $\frac{3}{16}$" diameter plunger loaded to 1280 pounds per square inch is placed on a $\frac{1}{8}$" tile and the load maintained for 1 minute with the material maintained at 120° F. shows an indentation varying from .015" to .025", whereas linoleum tile of the same thickness shows an indentation of .050" to .060" under the same conditions.

Our binder is particularly suited for the production of white or light colored tiles, due to the light color of the base resin and the flexiblizing and toughening agent. A white composition is produced by thoroughly mixing the following ingredients; all parts being given by weight:

|  | Parts |
|---|---|
| Cumar | 65 |
| Oil gel | 56 |
| Titanium oxide reduced with calcium sulphate | 124 |
| Whiting | 31 |
| Long fiber asbestos | 31 |
| Short fiber asbestos | 111 |

In this example, the oil gel is the same as that described above for the production of a red colored composition.

The amount of gel added to the base resin depends to some extent upon the hardness of the oil gel. For example, the production of a tile composition using Cumar as the base resin and an oil gel produced by mechanically oxidizing a soya bean oil-rosin mixture in which the soya bean oil represents 60% by weight of the total batch and the rosin 40% by weight, the ratio of Cumar to oil gel may be 65 parts to 45 parts by weight respectively. If a linseed oil gel produced by the shed process and heated with rosin as above described is used, the amount added to the resin may be increased.

For example, 80 parts by weight of Cumar to 30 parts by weight of shed oil-rosin mixture has been found satisfactory. When "mechanical oil" is used, the ratio of Cumar to oil gel may be 98 parts to 42 parts by weight respectively.

Other drying or semi-drying oils may be substituted for those herein recited or mixtures of drying and/or semi-drying oils may be used. In place of Cumar any light colored resin may be used, for example, "Amberol" or ester gum. The resin should preferably be alkali resistant and have a high melting point. The melting point of the resin must be sufficiently high to produce a final product which is hard, although sufficient toughening and flexiblizing agent is added to produce a tile capable of withstanding handling and shipment without cracking or breaking. We prefer to use Cumar because of its cheapness, light color, ready availability, and alkali resistance.

The production of striated or marbleized effects using our tile composition is described and claimed in the co-pending application of Norman Fredriksen, filed April 30, 1932 under Serial No. 608,360.

The term "tile", as employed herein, is intended to include hard, flat floor, wall and roof covering units, and also shaped elements such as corner pieces, cove and base pieces, etc., as well.

While we have described certain specific preferred embodiments of our invention it will be understood that the invention is not limited to the examples given but may be otherwise embodied and practiced within the scope of the following claims.

We claim:

1. An alkali resistant composition for use in the manufacture of hard tiles comprising a calenderable mass including Cumar having a melting point between about 100° and 140° C. and a toughening modifier comprising an oxidized siccative oil gel, the modifier being present in sufficient amount to overcome the inherent brittleness of the Cumar but in less amount than approximately one-half the amount of Cumar by weight whereby the inherent hardness of the Cumar is substantially unimpaired and characterizes the composition.

2. An alkali resistant composition for use in the manufacture of hard tiles comprising a calenderable mass including Cumar having a melting point between about 100° and 140° C. and a toughening modifier comprising a substantially completely oxidized siccative oil gel, the modifier being present in sufficient amount to overcome the inherent brittleness of the Cumar but in less amount than the amount of Cumar by weight whereby the inherent hardness of the Cumar is substantially unimpaired and characterizes the composition, the substantially completely oxidized siccative oil gel being substantially inert to atmospheric oxygen at ordinary room temperatures whereby curing of tiles formed from the composition is obviated.

3. A calenderable, alkali-resistant composition for use in the manufacture of hard tiles having a binder containing a major portion of Cumar having a melting point from about 100° to 140° C. and a toughening modifier including an oxidized siccative oil and an anticoagulant for the oil comprising rosin, the modifier being present in less than half the amount of the Cumar by weight, and being oxidized to a sufficient extent to substantially inhibit further absorption of oxygen at ordinary temperatures encountered in the use of the tiles.

4. A calenderable, alkali-resistant composition according to claim 3 in which the toughening modifier includes oxidized soya bean oil.

5. A hard, alkali-resistant tile comprising Cumar having a melting point from about 100° to 140° C., a fibrous filler, pigment and a toughening modifier including an oxidized siccative oil for the Cumar present in sufficient amount to overcome the inherent brittleness of the Cumar but in an amount less than half the quantity of Cumar present by weight, whereby the inherent hardness of the Cumar characterizes the tile.

6. A hard, alkali-resistant tile comprising Cumar having a melting point from about 100° to 140° C., a filler, a pigment and a modifier for the Cumar including a siccative oil oxidized sufficiently to render negligible the further absorption of oxygen from the atmosphere at ordinary temperatures, said modifier being present in no more than about half the quantity of Cumar present by weight, whereby the inherent hardness and alkali resistance of the Cumar characterize the tile.

7. A hard, alkali-resistant tile according to claim 6 in which the modifier includes oxidized soya bean oil.

8. A hard, alkali-resistant tile comprising a filler and a binder including Cumar having a melting point between about 100° and 140° C. and a toughening modifier for the Cumar including an oxidized siccative oil, the modifier being present in sufficient amount to overcome the inherent brittleness of the Cumar but in an amount less than the amount of Cumar by weight, whereby the inherent hardness of the Cumar characterizes the tile.

9. A hard, alkali-resistant tile comprising a fibrous filler, pigment and a binder including Cumar having a melting point between about 100° and 140° C. and a toughening modifier for the Cumar including an oxidized siccative oil-resin gel, said oil being sufficiently oxidized to render negligible the further absorption of oxygen from the atmosphere at ordinary temperatures, said modified being present in sufficient amount to overcome the inherent brittleness of the Cumar but in an amount less than the amount of Cumar by weight, whereby the inherent hardness of the Cumar characterizes the tile.

10. A hard, alkali-resistant tile comprising a filler and a binder including Cumar having a melting point between about 100° and 140° C. and a toughening modifier for the Cumar including a siccative oil gel, said oil gel being in such condition that absorption of oxygen from the atmosphere at ordinary temperature is negligible, the modifier being present in sufficient amount to overcome the inherent brittleness of the Cumar but in an amount less than the amount of Cumar by weight, whereby the inherent hardness of the Cumar characterizes the tile.

EDMUND CLAXTON.
MARTIN K. BARE.

CERTIFICATE OF CORRECTION.

Patent No. 2,022,707.   December 3, 1935.

EDMUND CLAXTON, ET AL.

It is hereby certified that error appears in the printed specification of the above numbered patent requiring correction as follows: Page 2, first column, line 11, for "placing" read place; page 3, second column, line 45, claim 9, for "modified" read modifier; and that the said Letters Patent should be read with these corrections therein that the same may conform to the record of the case in the Patent Office.

Signed and sealed this 14th day of January, A. D. 1936.

(Seal)

Leslie Frazer
Acting Commissioner of Patents.